United States Patent Office 3,274,053
Patented Sept. 20, 1966

3,274,053
SENNOSIDE DERIVATIVES AND PHARMACEUTICAL COMPOSITIONS CONTAINING SAME
Alfred Halpern, Great Neck, and Mortimer D. Sackler, New York, N.Y., assignors to Synergistics, Inc., a corporation of New York
No Drawing. Filed June 4, 1962, Ser. No. 199,605
48 Claims. (Cl. 167—65)

The present invention relates to new and novel therapeutic agents and the methods of isolating and preparing the same. In particular, it is concerned with sennocide tannate, sennoside amines, sennoside amine tannates, sennoside metallo tannates, and the methods and means of preparing and formulating the same, as well as the method of achieving physiological results through their administration, together with their use in the process of extracting sennosides.

Although *Cassia acutifolia* (Alexandria senna) and *Cassia angustifolia* (Tinnevelly senna) have been used as laxative agents since ancient times, it is only recently that their active principles have been identified (see U.S. Patent No. 2,350,295) as anthraquinoidal glycosides. The development of a chemical method of assay for the sennosides (see Journal Pharmacy and Pharmacology, 1950, 2:807–813) resulted in the improved standardization of the plant extract, so that thereafter these extracts could be utilized in therapy, based upon a quantitative determination of the active sennoside content with more accurate dosage administration.

While it is generally accepted that the sennosides exhibit an effective laxative therapeutic action, there are certain limitations inherent in their chemical and physical properties which narrow their utility. Thus, it may be seen that the sennosides are insoluble in aqueous fluids, so that it is virtually impossible to prepare a stable aqueous, dosage form of suitable concentration of active ingredients. Furthermore, on contact with water, for even minimal periods of time, substantial degradation of the active laxative principles occur, with consequent loss of potency and activity. This degradative hydrolysis of the active therapeutic moieties results in substantial variation in physiologic effect. In order to overcome hydrolytic degradation, the sennoside-containing pharmaceuticals prepared from either the active isolated glycoside or the extract of the plant, are utilized in an essentially dry form, such as tablets, granules and capsules, while high alcoholic solutions are suggested as liquid dose forms, although these are described as being unstable. The methods employed to obtain a stable pharmaceutical product even for these limited dry dosage forms are difficult, cumbersome and require costly special techniques.

In contrast to these inherent limitations of the conventional senna extracts and the sennosides, it was found that by causing these senna extracts or the isolated sennosides to react with either tannic acid or amines, as for example, choline, betaine, morpholine, methylglucamine, alkylamines and alkanolamines, then new compounds result which are stable and exhibit increased water-solubility. These new compounds possess substantial laxative activity which may be demonstrated on biologic assay. Furthermore, such compounds lend themselves to simple formulation techniques for compounding into pharmaceutical dosage forms which are suitable for therapeutic use without evidencing the disadvantages of the older agents.

Suitable extracts of the senna plant may be obtained by extracting *Cassia acutifolia* or *Cassia angustifolia* as well as other sennoside-containing specimens of the Cassia family, with organic and hydro-organic solvents, as well as chemical reagents according to the known methods. (See, for example, U.S. Patent No. 2,350,295, which describes a method of precipitating sennosides from appropriate solvents in the form of their alkaline earth salts, as for example, calcium sennosides; British Patent No. 832,017, which describes a method of obtaining a senna plant extract which comprises the steps of extracting senna with a neutral or acid aqueous organic solvent. A metal salt of an aliphatic acid is added to this extract to precipitate the water soluble senna products in intimate association with the metallo salt.) These extracts of the senna plant contain common laxative principles which are essentially insoluble in water and strong alcoholic solution. Two glycosides called Sennoside A and Sennoside B are believed to be the primary laxative principles of senna. Both glycosides have the same empiric formula, $$C_{42}H_{38}O_{20}$$

differing in the manner of the linkage of glucose to the aglycone fraction of each molecule. The aglycone of the sennoside contains a carboxyl group and may be considered to be derivatives of rhein.

Other substances have been found in the senna plant, but these are not associated with the laxative properties. Such substances as sennacrol, sennarhemnetin, kaempfe- $$(C_{15}H_6O_2(OH)_4)$$

rol, and its glycoside kaempferin, and a small amount of essential oil, have been isolated from the senna plant. These extracts of suitable specimens of the senna family may contain varying proportions of the Sennosides A and B, but the effect of these varying proportions of the two sennosides in either the senna extract or even preparations of the sennosides themselves, is not biologically significant since both glycosides apparently act identically in the colon. In the colon the glucose moiety is split as a result of enzymatic digestion by the bacterial flora present, particularly *E. coli*. After splitting, the aglycone formed from Sennoside A and Sennoside B is identical. This aglycone then exerts its physiologic effect upon the colon.

The chemical structure of the Sennosides A and B is known. It has a molecular weight of 862.72, and an empiric formula of $C_{42}H_{38}O_{20}$. Sennoside A is built up from the dextro-rotatory aglucon, sennidin A, and D-glucose, while Sennoside B is built up from the inter-molecularly compensated mesosennidin B, and D-glucose. Sennoside A is a crystalline substance in the form of rectangular yellow plates, decomposing at 200–240° C. It is insoluable in water, benzene, ether and chloroform. Sennoside B is in the form of light yellow prisms, decomposing at 180–186° C., and has the same solubility characteristics as Sennoside A, but is more soluble, being somewhat soluble in hot water. Both Sennosides A and B may be determined by chemical and biological methods with a high degree of accuracy even in the presence of other substances such as are contained in the senna extract mentioned above.

Tannic acid occurs as yellowish to light brown glistening scales, also as an amorphous powder and sometimes as a light, spongy mass. It is official in the United States National Formulary and the British Pharmacopoeia. It has a faint characteristic odor, with an astringent taste and gradually darkens on exposure to light and air. Tannic acid has been utilized in treatment of humans and animals for sometime, and a special use has been in the control of diarrhea and in burn therapy.

Sennoside tannate is obtained from the reaction between tannic acid, N.F., and the Sennosides A and B. In carrying out this reaction, either the natural mixture of the sennosides, as is obtained from the plant, or an extract may be used, or the individual, isolated and separated Sennoside, as the Sennoside A or Sennoside B, may be used. Irrespective of the degree of purity of the sennoside-containing starting material, the tannic acid reaction will proceed in virtually the same way.

In order to carry out the reaction between the sennosides and tannic acid, equimolar proportions of tannic acid and the sennosides are dissolved, or dispersed, in a hydroalcoholic or other suitable inert solvent with the aid of gentle heat. After a reaction period of approximately two hours, the mixture is filtered and concentrated under reduced pressure and treated with five volumes of ether. After standing overnight, the crystalline precipitate is filtered, washed with ether and dried. The sennoside-tannate is a dark brown crystalline homogeneous compound, melting at 189–190° C. It is soluble in water, methanol, ethanol, acetone, sorbitol and glycerin.

The new compound has a characteristic ultra-violet spectrum and infra-red spectrum. In analyzing the infra-red spectrum of the sennoside-tannate, both the bands for the Sennosides A and B at 1070, 1018 and 1257, cm.$^{-1}$, and the tannic acid bands at 1537, 1270, 1203 and 1030, cm.$^{-1}$, are observed. The proof of the formation of a compound, as opposed to a chemical mixture was obtained by comparing the infra-red spectra of a mechanical mixture of Sennosides A and B and tannic acid with that of the reacted compound, sennoside-tannate. The known mixture was prepared to contain the exact proportion of tannic acid and sennosides A and B, as was determined by chemical analysis to be present in the reacted product. After thorough mixing, a rock salt, infra-red (2 to 15 microns) absorption spectrum was obtained, using this mixture as a Nujol mull vs. air. In the spectrum of the mechanical mixture, bands were observed at 956, 898 and 846, cm.$^{-1}$, which were not present in the spectrum of the product obtained as a result of the reaction between Sennosides A and B and tannic acid.

Moreover, the 1537 cm.$^{-1}$ band is relatively more intense in the mixture than in the reacted compound obtained from Sennosides A and B and tannic acid. Similarly, while the 1712 and 1612, cm.$^{-1}$ bands have the same intensity in the spectrum of the mixture, the 1612, cm.$^{-1}$ band is relatively the much stronger of the two in the spectrum of the reacted compound. The biological potency of varying levels of the new compound was compared with equal dosages of a reference standard in mice and it was established that this new compound of sennoside-tannate exhibited a high order of laxative activity.

The reaction between the Sennosides A and B and tannic acid proceeds to virtually theoretical completion when an extract of the senna plant is treated with tannic acid. Irrespective of the nature of the senna plant extract used as a starting material, the identical end-product of sennoside-tannate is obtained. Thus, the defatted ground plant may be used; the dried ground whole-leaf, an alcoholic senna-plant extract, the aqueous metalloprecipitated senna plant extract, the dioxane plant extracts, as well as other organic solvent senna plant extracts.

These extractive senna plant materials are first assayed for senno-side content by the conventional chemical and biologic assay procedures. A slurry of the sennosides-containing plant extract is then reacted with a stoichiometric equivalent quantity of tannic acid. In carrying out the reaction any inert solvent, as for example, diluted methanol, acetone, chloroform or mixtures of the same, may be used. After the reaction has proceeded to completion, the solvent is evaporated and the residue recovered. The residue now contains sennoside tannate and may be used in therapy without further processing.

It will be noted that when the extracts of the senna plant are used as starting materials for this reaction, the characteristic infra-red and ultra-violet spectra for sennoside-tannate are obtained as well as an increase in the water-solubility of the reacted material, when compared with that of the starting material.

Sennoside-tannate may be obtained through still another method and that is to extract the defeated, ground senna-plant with either alcoholic solutions, acetone, water or mixtures of these, containing tannic acid. In carrying out this process, any part of the plant containing the sennosides may be used as starting material. The dried, ground plant material is defatted with either benzene or petroleum ether. The defatted material is then suspended in a 10 volume excess of the solvent containing a calculated quantity of tannic acid, based upon the prior chemical determination of the sennosides present in the starting material. After a suitable reaction period of from two to four hours, the soluble portion is filtered and the marc washed with an equal volume of the same solvent. The solvent extracts are then combined and evaporated under reduced pressure, to dryness. The dried residue is washed with warm water and dried. The dried substance consists essentially of sennoside-tannate.

The methods described may be revised, in effect, to obtain the sennosides. Sennoside-tannate, obtained by any of the methods described above, may be used as a source of sennosides by reacting an acetone solution or dispersion of sennoside tannate with a specific substance capable of replacing the tannic acid. The freed sennoside then remains in the acetone solution, and after evaporation of the solvent results in a substantially pure, crystalline glycoside. Should it be desired to conduct this reaction in an aqueous medium, then mild acid may be used to liberate the sennoside, which is recovered through precipitation techniques.

Amine sennosides are obtained when a stoichiometric equivalent quantity of an appropriate amine, as for example, betaine, choline, morpholine, methyl glucamine, mono, di and trialkylamine of from one through four carbon atoms in alkyl chain length and the mono, di and trialkanolamines of from one through four carbon atoms in alkyl chain length are reacted with a sennoside, either as a mixture of the sennosides, as for example, Sennosides A and B, or in an isolated state as for example, Sennoside A or Sennoside B, or when the sennoside is present in a senna plant extract.

The reaction between amine substances and the sennosides is of special importance when certain pharmacologically active amines are used as reagents. This particular group of amine drugs have the common noxious property of causing constipation in the course of their therapeutic use, which inhibits and limits not only the therapeutic effect obtained, but presents special dangers. Thus, it has been shown that constipating medications constitute a serious threat to the cardiovascular patient since the use of these drugs increases the straining effort associated with bowel function. Excessive straining associated with bowel function has been reported to be a precipitating factor for many serious cardiovascular accidents and has, on occasion, resulted in death. A particular advantage of the new sennoside amine compounds, when the amine moiety consists of a therapeutic compound capable of inhibiting peristaltic action, is the avoidance, or lessened occurrence, of this noxious side effect. Such amines as promazine, chlorpromazine, amphetamine, ephidrine, n-methyl ephedrine, atropine, hyoscyamine, scopalamine, morphine, meperidine, methadon, levorphan, codeine, dromoran and n-allylnormorphine, may be reacted with sennosides to form the respective amine sennoside which do not have the disadvantage of causing peristaltic inhibition (as do the parent amines) when administered.

The reaction is carried out in an inert medium, as for example, hydroalcoholic solutions, acetone, chloroform or dioxane. When carrying out this reaction the sennoside material is either dissolved or dispersed in five volumes of solvent to which is added an equal volume of a solution containing the calculated quantity of the selected amine. The mixture is stirred, warmed to 50° C. and the solvent concentrated to approximately one-third of the total volume. The mixture is filtered and the solution evaporated to dryness. The dried residue is then redissolved in a small amount of alcohol and precipitated with ether. The precipitate is filtered and dried. The dried powder is th amine-sennoside which is a stable, light tan powder, soluble in water, methanol, ethanol, acetone and insoluble in ether. The resultant compounds are stable under the usual conditions of storage and has a characteristic melting point and infra-red and ultra-violet spectra. The amine-sennosides physiologically evidences a high degree of activity. They may be utilized for the preparation of pharmaceutically acceptable dosage forms to be used in therapy.

Choline sennoside is obtained by a preferred method when choline bicarbonate reacts with the sennosides in equimolar proportions in an inert medium, as for example, water or alcohol. The compound is obtained as a light tan powder which is soluble in water, methanol and ethanol, glycerin, sorbitol and insoluble in ether. Choline sennoside melts at 144–146.5° C. and has a characteristic infra-red and ultra-violet spectrum. When assayed biologically, choline sennoside exhibits a high degree of laxative activity. The reaction may be carried out either with the free sennosides as a mixture or the individual Sennosides A and B or with a plant extract containing these substances.

Other amines may be utilized in equimolar equivalent quantities in the same method to result in the appropriately substituted amine sennoside.

The reaction between the amine and the sennoside may be utilized as a method for extracting and isolating sennosides. The older methods for the isolation of sennosides involve lengthy and cumbersome steps with poor yields. When a dry, ground sample of a plant containing sennosides is treated with a solution of the amines described above, extraction of the sennosidal component results. It is desirable for this procedure to utilize a slight excess of the amine substance, as for example, between 0.1 percent and 10 percent. The theoretical calculated quantity of the amine is determined from the analysis of the sennoside content of the particular natural plant substance to be used. The dried plant material is ground to a powder of less than 60 mesh in size. A preferred size is 120 mesh. The ground plant material is defatted with benzene or petroleum ether and then macerated with a ten volume excess of the selected amine solution. Percolation may be used as an alternative extractive technique. The mixture is filtered and the solution concentrated under reduced pressure to one-third its volume and filtered again. To this solution is then added a small amount of an amine-precipitating agent, as for example, tannic acid or an amine-liberating substance, as for example, sodium hydroxide, potassium hydroxide or calcium hydroxide, in sufficient quantity to displace the amine from the sennoside, and the mixture extracted with an immiscible solvent, as for example, ether or chloroform, in which the liberated amine base is soluble. The solvents are separated and the aqueous layer carefully acidified with an acid ion, capable of retaining in solution the metallic ion used to displace the amine. Such acids as hydrochloric, sulfuric, phosphoric, propionic and acetic may be used. Upon acidification to a pH of between 2 and 3, a precipitate of the sennosides occurs which is filtered, washed with water and dried. While temperature exerts little effect, it is preferred to work with cold aqueous solutions in order to neutralize the heat of reaction evolved during the neutralization stages. The filtered sennosides may then be recrystallized from diluted methanol-ether solutions. The sennosides obtained in this manner agree with the physical constants represented for these substances. When the described extraction procedure is practiced, choline bicarbonate, morpholine and the mono, di and trialkylamines of from one through four carbon atoms in alkyl chain length, are preferred amine substances.

Sennoside tannate combines with basic substances, as for example, metallic ions, ammonia and amine bases to form double salts. In preparing such double salts, sennoside tannate is dissolved or dispersed in an inert solvent, as for example, methanol, ethanol, acetone, water or mixtures of these, and to this is added a stoichiometric equivalent quantity of the metallic compound, ammonia or the amine. When a metal is used, the hydroxide, carbonate or bicarbonate form is preferred and such metal ions as sodium, potassium, lithium, magnesium, calcium, iron, aluminum and zinc may be utilized. Ammonia may be used either as the gas or as ammonium hydroxide, ammonium carbonate or ammonium bicarbonate and the following amine bases or their carbonates or bicarbonates may be used: betaine, morpholine, methylblucamine, mono, di and trialkylamines, mono, di and trialkanolamines, promazine, chlorpromazine, amphetamine, ephedrine, n-methylephedrine, atropine, hyoscyamine, scopalamine, morphine, meperidine, methadon, levorphan, codeine, dromoran and n-allylnormorphine.

A particular advantage of the metallo-sennosidal tannate, the ammonium sennosidal tannate and the amine sennosidal tannate is their stability. In addition, they afford the means to administer either the metallic ion or the amine compound without noxious local gastrointestinal side reactions, such as constipation.

When it is desired to utilize either the sennoside tannates or amine sennosides, or the amine sennoside tannate, or the metallo-sennoside tannate in therapy, they may be administered in the form of solid preparations, such as tablets, capsules, granules, powders or as liquid preparations, as for example, syrups, tinctures, elixirs, suspensions and solutions, by the oral route. For rectal administration, either a solid suppository may be used or a liquid in the form of an enema. Solutions dissolved in water-for-injection may be used for parenteral administration. Irrespective of the route of administration, a common mechanism of biologic activity is observed.

The daily dosage range for the administration of these new sennosidal derivatives is from 2 to 75 mg. of the compound, based upon its sennoside content, and this dosage may be administered either as a single unit dose or in multiple dosages. The exact daily dosage administered will depend upon the specific needs of the patient and the degree of pharmacologic effect desired. Thus, it will be seen that for radiologic purgation, a higher dosage range is demanded than that necessary to cause a laxative neutralization of the constipating effects of a compound such as iron. Furthermore, the treatment of chronic refractory constipation will require a higher dose than that utilized to correct the transient episode of constipation. Moreover, an infant and a child will require a different dosage range than will an adult. When these new sennosidal derivatives are administered, the laxative effect will result within six to ten hours following oral administration or within fifteen minutes to one hour following rectal administration. The flexibility afforded by the broad range in dosage of these new compounds, as well as the different dosage forms which may now be compounded, permits the physician to adequately treat these broad pathologic states in an individualized manner, a practice which has been hitherto unavailable, but long sought for.

The following examples illustrate the scope of the present invention:

*Example 1*

To a solution of 86.3 mg. of Sennosides A and B, dissolved in 250 cc. of 70 percent aqueous methanol, is added a solution of 340.2 mg. of tannic acid, N.F., dissolved in 100 ml. of 70 percent aqueous acetone. The mixture is stirred and warmed to 50° C. for one hour, after which time the solution is concentrated, under reduced pressure, to approximately one-third its volume.

The mixture is filtered and is concentrated further, under reduced pressure, to a volume of about 15 ml. To this is added 10 ml. of dry ether and the whole set aside in an ice-chest to crystallize. The crystalline material is separated by filtration and is washed with a small amount of cold ether and dried. The dried product is sennoside tannate, a dark brown crystalline compound, melting at 189–190° C. It is soluble in water, methanol, ethanol, acetone, sorbitol and glycerin and insoluble in ether and consists of 79.8 percent tannic acid and 20.2 percent sennosides. The infra-red spectrum shows absorption bands at 1070, 1018 and 1257, cm.$^{-1}$ and also at 1537, 1270, 1203 and 1030, cm.$^{-1}$, and an ultra-violet absorption spectrum with maxima at 260 and 270 mu.

*Example 2*

One kilogram of the dried, ground pod of *Cassia acutifolia* is defatted with 10 liters of benzol and dried. The dried, defatted senna pod is assayed chemically for Sennosides A and B. This powder is then dispersed in 10 liters of 70 percent acetone-water (v./v.), and to this is added 2.5 mg. of tannic acid, N.F., for each mg. of sennosides contained in each gram of the defatted senna plant. The mixture is refluxed for 1 hour and filtered. The acetone is concentrated under vacuum distillation to approximately 100 cc. and mixed with 100 cc. of ether. On standing overnight, crystallization takes place. The crystals are filtered, washed with cold ether and dried. The dried crystalline material melts at 189–190° C. and is sennoside tannate. The product has an infra-red spectrum with absorption bands at 1070, 1018 and 1257, cm.$^{-1}$, and also at 1537, 1270, 1203 and 1030 cm.$^{-1}$. The compound is soluble in methanol, ethanol, acetone and water and insoluble in ether.

*Example 3*

To one kilogram of the dried, ground leaf of a sennoside-containing plant, as for example, *Cassia acutifolia* or *Cassia angustifolia*, is added 5 liters of petroleum ether, and the mixture stirred for two hours. The mixture is filtered and the solid-portion dried. The defatted ground whole leaf is chemically assayed for its sennoside content. To 100 grams of the dried, defatted powdered leaf, suspended in 1 liter of 70 percent methanol-water (v./v.), is added 200 cc. of an acetone solution containing 3 mg. of tannic acid, N.F., for each mg. of sennoside per gram of ground leaf used. The mixture is warmed for one hour and the solvent evaportted to dryness. The dried residue is washed with 3 portions of 50 cc. of water and the solid material dried. The dried residue now contains sennoside tannate as well as unreacted, physiologically inert plant materials. The chemical and physical assay of the resultant material establishes the exact concentration of active material per gram and this composition may be utilized for the preparation of pharmaceutical dosage forms without further purification.

Should it be desired to isolate and separate the sennoside tannate from the dross materials, then the mixture is suspended in 70 percent acetone-water (v./v.) in a ratio of 10 cc. of solvent for each gram weight of the sennoside tannate composition. The suspension is stirred for two hours while warming to 60° C. and then allowed to sediment. The supernatant fluid is poured off and the solvent replaced with an equal volume of 70 per cent acetone-water and the process repeated. The acetone extracts are then combined, evaporated to dryness under reduced pressure, and the residue consists of sennoside tannate with the characteristic infra-red and ultra-violet spectra.

*Example 4*

Ten kilograms of the dried, ground senna plant, consisting of either the whole plant or its separate parts, such as the seed pods or the leaves or mixtures of these, are defatted with benzol and then extracted with dioxane. The dioxane percolation is continued until a specimen of the fresh percolate is shown to contain no sennoside by chemical assay. The solvent is then removed under reduced pressure, and the residue dried and assayed for sennoside content. The residue is then dispersed in 70 percent methanol-water (v./v.) and to this is added a solution of tannic acid dissolved in acetone. The ratio of the tannic acid to the sennoside content of the dried extract for this reaction is four parts tannic acid to one part sennoside. The mixture is warmed for two hours at 60° C. and the solvent removed under reduced pressure. The residue consists of essentially sennoside tannate which may be further purified through dissolving in 70 percent acetone-water and adding to it sufficient alcohol to just initiate precipitation. The purified sennoside extract thus obtained conforms, in every respect, to that obtained as a result of Example 1.

*Example 5*

One kilogram of the senna extract, obtained as a result of the practice of British Patent No. 832,017, is dispersed in five liters of a solution of 70 percent ethanol-water and mixed with 1 liter of a solution of tannic acid in 70 percent acetone-water so that the ratio of tannic acid to the sennosides being present in the senna extract used, is from 2 to 4 parts tannic acid to 1 part sennoside. The above mentioned patent describes a method of obtaining a senna plant extract which comprises the steps of extracting senna with a neutral or acid aqueous organic solvent. A metal salt of an aliphatic acid is added to this extract to precipitate the water soluble senna products in intimate association with the metallo salt.

The mixture is stirred, allowed to stand overnight at room temperature, and the solvent evaporated. The dried residue contains sennoside tannate in addition to unreacted materials. The mixture is sufficiently pure for further use in pharmaceutical manufacture. The exact concentration of sennoside tannate present in the mixture may be determined with accuracy, using quantitative infra-red spectrum techniques, since the infra-red spectrum of the sennoside tannate is characteristic for the molecule. Should it be desired to purify the mixture, then selective extraction of the sennoside tannate with 70 percent acetone-water percolation techniques may be utilized, as described in Examples 1 through 4. The isolated and purified sennoside tannate obtained melts at 180–190° C., and is identical in every respect, to the product obtained as a result of the steps of Example 1.

*Example 6*

The metallo-salt of the Sennosides A and B obtained, as described in U.S. Patent No. 2,350,295, may be substituted in equimolecular quantities for the Sennosides A and B, as described in Example 1, for the preparation of sennoside tannate. This patent describes a method of precipitating sennosides from appropriate solvents in the form of their alkaline earth salts, as for example, calcium sennosides. The solution or dispersion of the metallo-sennosides in 70 percent aqueous methanol is acidified with a small amount of 10 percent sulphuric acid to a pH of 3 and the mixture filtered. The filtrate is assayed for sennoside content and to it is added a solution of tannic acid in acetone, so that the ratio of tannic acid to the sennosides is at least 2 mols of tannic acid for each mol of sennoside. The presence of excess tannic acid is not critical and the unreacted tannic acid is removed during the purification steps. The remainder of the steps of the reaction being the same as described in Example 1, and the resultant product is sennoside tannate, conforming, in every respect, to the product obtained as a result of Example 1.

*Example 7*

To a solution of 43 mg. of Sennosides A and B, dissolved in 20 cc. of 70 percent ethanol, is added 16.5 mg.

of choline bicarbonate, dissolved in 10 cc. of 70 percent ethanol. An immediate ebullition of carbon dioxide results, and the solution is warmed for one-half hour, at temperatures not exceeding 40° C., after which time the solvent is evaporated to dryness. The dried residue is dissolved in 5 cc. of distilled water and extracted two times with either. To the aqueous solution is added 2 volumes of acetone and 1 volume of ether and the solution set aside to crystallize in the cold. Choline sennoside is obtained as a light tan crystalline powder which melts at 144–146.5° C. Choline sennoside analyzes in good agreement for its theoretical elemental values, calculated as $C_{52}H_{64}O_{22}N_2$, with a molecular weight of 1069.1.

Theory: carbon, 58.42; hydrogen, 6.03; nitrogen, 2.62. Found: carbon, 55.51; hydrogen, 6.47; nitrogen, 2.75.

It is extremely soluble in water, methanol, ethanol; insoluble in acetone, chloroform and petroleum ether. The compound has a characteristic infra-red spectrum and ultra-violet spectrum. On biological assay in mice, choline sennoside exhibits a high order of biological activity. Choline sennoside may be utilized for further pharmaceutical manufacture and is stable on storage.

*Example 8*

One kilogram of the dried, ground senna plant, as for example, *Cassia acutifolia* or *Cassia tinnevelly*, is defatted with 10 liters of petroleum benzin. The defatted ground plant is dried and extracted with 50 liters of 70 percent aqueous methanol containing 20 gm. of choline. The percolate is concentrated under reduced pressure to a volume of 100 cc. and to this is added 20 cc. of benzene and the mixture distilled to one-half its volume, to remove the water present. To the substantially anhydrous methanol solution is added four volumes of acetone and the whole set aside to crystallize. Crystals of choline sennoside are obtained which melt at 144–146.5° C. and are soluble in methanol, ethanol and water and insoluble in petroleum ether and acetone.

*Example 9*

One kilogram of dried, ground senna pod is extracted with 25 liters of a mixture of equal parts of dioxane and morpholine. The solvent is removed under reduced pressure, from the liquid extracts and the residue dissolved in just sufficient anhydrous methanol to achieve solution. To this is added an equal volume of acetone and the mixture set aside to crystallize. The resultant crystals are morpholine sennoside, which are soluble in water, and alcohol, but insoluble in petroleum ether and chloroform.

*Example 10*

Five kilograms of the dried, ground leaf of the senna plant as for example, *Cassia acutifolia* and *Cassia tinnevelly*, is extracted with 100 liters of a 0.1 percent solution of choline bicarbonate. The aqueous solution is evaporated to dryness, under reduced pressure, and the temperature is not to exceed 40° C. The solid residue is mixed with two volumes of warm acetone and filtered. The filtrate is evaporated to dryness ad consists of choline sennoside, melting at 144 to 146.5° C.

*Example 11*

To a solution of 86.3 mg. of Sennosides A and B, dissolved in 100 cc. of 70 percent methanol, is added a solution of 57 mg. of morphine dissolved in 25 cc. of acetone. The mixture is warmed for one-half hour at a temperature not exceeding 50° C. and the solvent evaporated. The residue is dried and recrystallized from an ether-methanol solution. The resultant crystalline compound is morphine sennoside, a stable salt, possessing good biologic activity without causing constipation as a side effect. The compound shows maximum ultra-violet spectra at 285 mu and a minima at 260 mu.

*Example 12*

To 43 mg. of Sennosides A and B, dissolved in 10 cc. of acetone, is added a solution of 57 mg. of atropine dissolved in 10 cc. of acetone. The mixture is warmed for one-half hour at a temperature not exceeding 40° C. and the solvent evaporated. The dried residue consists of atropine Sennoside, which is soluble in methanol, but insoluble in chloroform.

*Example 13*

To a solution of 863 mg. of Sennosides A and B, dissolved in 10 cc. of acetone, is added 33 mg. of ephedrine dissolved in 10 cc. of acetone. The mixture is warmed for one-half hour at a temperature not exceeding 40° C. and the solvent evaporated. The dried residue consists of ephedrine sennoside.

*Example 14*

When, in place of the choline bicarbonate used in Example 7, there is substituted in equimolecular proportions the following amines, their carbonates and bicarbonate salts, there is obtained the respective amine sennoside set forth in the following table:

TABLE I

| Amine compound used as a reagent: | Respective sennoside amine compound obtained |
|---|---|
| Betaine base | Betaine sennoside. |
| Betaine carbonate | Do. |
| Betaine bicarbonate | Do. |
| Choline base | Choline sennoside |
| Choline carbonate | Do. |
| Morpholine base | Morpholine sennoside. |
| Morpholine carbonate | Do. |
| Morpholine bicarbonate | Do. |
| Mehylglucamine base | Methylglucamine sennoside. |
| Methylglucamine carbonate | Do. |
| Methylglucamine bicarbonate | Do. |
| Monomethylamine base | Monomethylamine sennoside. |
| Monomethylamine carbonate | Do. |
| Monomethylamine bicarbonate | Do. |
| Monoethylamine base | Monoethylamine sennoside. |
| Monoethylamine carbonate | Do. |
| Monoehtylamine bicarbonate | Do. |
| Morpropylamine base | Monopropyl sennoside. |
| Monopropylamine carbonate | Do. |
| Monopropylamine bicarbonate | Do. |
| Monoisopropylamine base | Monoisopropyl sennoside. |
| Monoisopropylamine carbonate | Do. |
| Monoisopropylamine bicarbonate | Do. |
| Mono-n-butylamine base | Mono-n-butyl sennoside. |
| Mono-n-butylamine carbonate | Do. |
| Mono-n-butylamine bicarbonate | Do. |
| Monoisobutylamine base | Monoisobutyl sennoside. |
| Monoisobutylamine carbonate | Do. |
| Monosiobutylamine bicarbonate | Do. |
| Dimethylamine base | Dimethylamine sennoside. |
| Dimethylamine carbonate | Do. |
| Dimethylamine bicarbonate | Do. |
| Diethylamine base | Diethylamine sennoside. |
| Diethylamine carbonate | Do. |
| Diethylamine bicarbonate | Do. |
| Dipropylamine base | Dipropylamine sennoside. |
| Dipropylamine carbonate | Do. |
| Dipropylamine bicarbonate | Do. |

TABLE I—Continued

| Amine compound used as a reagent: | Respective sennoside amine compound obtained |
|---|---|
| Diisopropylamine base | Diisopropylamine sennoside. |
| Diisopropylamine carbonate | Do. |
| Diisopropylamine bicarbonate | Do. |
| Di-n-butylamine base | Di-n-butylamine sennoside. |
| Di-n-butylamine carbonate | Do. |
| Di-n-butylamine bicarbonate | Do. |
| Diisobutylamine base | Diisobutylamine sennoside. |
| Diisobutylamine carbonate | Do. |
| Diisobutylamine bicarbonate | Do. |
| Trimethylamine base | Trimethylamine sennoside. |
| Trimethylamine carbonate | Do. |
| Trimethylamine bicarbonate | Do. |
| Triethylamine base | Triethylamine sennoside. |
| Triethylamine carbonate | Do. |
| Triethylamine bicarbonate | Do. |
| Tripropylamine base | Tripropylamine sennoside. |
| Tripropylamine carbonate | Do. |
| Tripropylamine bicarbonate | Do. |
| Triisopropylamine base | Triisopropylamine sennoside. |
| Triisoproplyamine carbonate | Do. |
| Triisopropylamine bicarbonate | Do. |
| Tri-n-butylamine base | Tri-n-butylamine sennoside. |
| Tri-n-butylamine carbonate | Do. |
| Tri-n-butylamine bicarbonate | Do. |
| Triisobutylamine base | Triisobutylamine sennoside. |
| Triisobutylamine carbonate | Do. |
| Triisobutylamine bicarbonate | Do. |
| Monomethanolamine base | Monomethanolamine sennoside. |
| Monomethanolamine carbonate | Do. |
| Monomethanolamine bicarbonate | Do. |
| Monoethanolamine base | Monoethanolamine sennoside. |
| Monoethanolamine carbonate | Do. |
| Monoethanolamine bicarbonate | Do. |
| Monopropanolamine base | Monopropanolamine sennoside. |
| Monopropanolamine carbonate | Do. |
| Monopropanolamine bicarbonate | Do. |
| Monoisopropanolamine base | Monoisopropanolamine sennoside. |
| Monoisopropanolamine carbonate | Do. |
| Monoisopropanolamine bicarbonate | Do. |
| Dimethanolamine base | Dimethanolamine sennoside. |
| Dimethanolamine carbonate | Do. |
| Dimethanolamine bicarbonate | Do. |
| Diethanolamine base | Diethanolamine sennoside. |
| Diethanolamine carbonate | Do. |
| Diethanolamine bicarbonate | Do. |
| Dipropanolamine base | Dipropanolamine sennoside. |
| Dipropanolamine carbonate | Do. |
| Dipropanolamine bicarbonate | Do. |
| Diisopropanolamine base | Diisopropanolamine sennoside. |
| Diisopropanolamine carbonate | Do. |
| Diisopropanolamine bicarbonate | Do. |
| Trimethanolamine base | Trimethanolamine sennoside. |
| Trimethanolamine carbonate | Do. |
| Trimethanolamine bicarbonate | Do. |
| Triethanolamine base | Triethanolamine sennoside. |
| Triethanolamine carbonate | Do. |
| Triethanolamine bicarbonate | Do. |
| Tripropanolamine base | Tripropanolamine sennoside. |
| Tripropanolamine carbonate | Do. |
| Tripropanolamine bicarbonate | Do. |
| Triisopropanolamine base | Triisopropanolamine sennoside. |
| Triisopropanolamine carbonate | Do. |
| Triisopropanolamine bicarbonate | Do. |
| Promazine | Promazine sennoside. |
| Chlorpromazine | Chlorpromazine sennoside. |
| Amphetamine | Amphetamine sennoside. |
| Ephedrine | Ephedrine sennoside. |
| n-Methylephedrine | n-Methylephedrine sennoside. |
| Atropine | Atropine sennoside. |
| Hyoscyamine | Hyoscyamine sennoside. |
| Scopalamine | Scopalamine sennoside. |
| Morphine | Morphine sennoside. |
| Meperidine | Meperidine sennoside. |
| Methadon | Methadon sennoside. |
| Levorphan | Levorphan sennoside. |
| Codeine | Codeine sennoside. |
| Dromoran | Dromoran sennoside. |
| n-Allylnormorphine | n-Allylnormorphine sennoside. |

The sennoside reagent to be used in this reaction may be either Sennosides A and B, Sennoside A and Sennoside B, the dried, ground plant containing the sennosides, a suitable extract of a plant containing the sennosides and the dried, ground, individual parts of the senna plant containing the sennosides, as for example, the seed pod or the leaf. The remainder of the steps as described in Example 7, employing the individual sennosides, or Examples 8, 9 and 10, wherein plant extracts are used, are the same.

*Example 15*

To a solution of 0.001 mol of sennoside tannate, dissolved in 25 cc. of 70 percent methanol, is added an exact stoichiometric equivalent quantity of 0.001 mol of choline, as the free base, carbonate or bicarbonate salt, dissolved in 10 cc. of methanol. The solution of the choline reagent is added slowly, drop-wise, to the sennoside tannate solution while stirring. When all of the choline reagent has been added, the stirring is continued and the solution set aside for one-half hour. Gentle heat may be employed, but the temperature should never be allowed to rise above 40° C. The solvent is then evaporated and the residue recovered. The dried residue is crystalline in nature and extremely soluble in water and methanol, but insoluble in acetone. The pH of a one percent solution is between pH 6 and pH 7. The compound is the choline salt of sennoside tannate and exhibits good biological properties which may be used in the manufacture of pharmaceuticals and is stable under the usual conditions of storage.

Example 16

In place of the choline used in Example 15, above, may be substituted, in stoichiometric equivalent quantities, the following amines, either as the free base or the carbonate or bicarbonate salt: betaine, morpholine, methylglucamine, methylamine, ethylamine, propylamine, isopropylamine, butylamine, isobutylamine, dimethylamine, diethylamine, diproplyamine, diisopropylamine, dibutylamine, diisobutylamine, trimethylamine, triethylamine, tripropylamine, triisopropylamine, tributylamine, triisobutylamine, monomethanolamine, monoethanolamine, monopropanolamine, monoisopropanolamine, monobutanolamine, monoisobutanolamine, dimethanolamine, diethanolamine, dipropanolamine, diisopropanolamine, dibutanolamine, diisobutanolamine, trimethanolamine, triethanolamine, tripropanolamine, triisopropanolamine, tributanolamine, triisobutanolamine, promazine, chlorpromazine, amphetamine, ephedrine, n-methylephedrine, atropine, hyoscyamine, scopalamine, morphine, meperidine, methadon, levorphan, codeine, dromoran and n-allylnormorphine; the remainder of the steps being the same. The resultant product being the respective amine sennoside tannate, as for example, betainesennoside tannate, morpholinesennoside tannate, methylglucaminesennoside tannate, methylaminesennoside tannate, ethylaminesennoside tannate, propylaminesennoside tannate, isopropylaminesennoside tannate, butylaminesennoside tannate, isobutylaminesennoside tannate, dimethylaminesennoside tannate, diethylaminesennoside tannate, dipropllaminesennoside tannate, diisopropylaminesennoside, tannate, dibutylaminesennoside tannate, diisobutylaminesennoside tannate, trimethylaminesennoside tannate, triethylaminesennoside, tannate, tripolyaminesennoside, tannate, triisopropylaminesennoside tannate, tributylaminesennoside tannate, triisobutylaminesennoside tannate, monomethanolaminesennoside tannate, monoethanolaminesennoside tannate, monopropanolaminesennoside tannate, monoisopropanolaminesennoside tannate, monobutanolaminesennoside tannate, monoisobutanolaminesennoside tannate, dimethanolaminesennoside tannate, diethanolaminesennoside tannate, dipropylaminesennoside tannate, diisopropanolaminesennoside tannate, dibutanolaminesennoside tannate, diisobutanolaminesennoside tannate, trimethanolaminesennoside tannate, triethanolaminesennoside tannate, tripropanolaminesennoside tannate, triisopropanolaminesennoside tannate, tributanolaminesennoside tannate, triisobutanolaminesennoside tannate, promazinesennoside tannate, chlorpromazinesennoside tannate, amphetaminesennoside tannate, ephedrinesennoside tannate, n-methylephedrinesennoside tannate, atropinesennoside tannate, hyoscyaminesennoside tannate, scopalaminesennoside tannate, morphinesennoside tannate, meperidinesennoside tannate, methadonsennoside tannate, levorphansennoside tannate, codeinesennoside tannate, dromoransennoside tannate and n-allylnormorphinesennoside tannate.

Example 17

In place of the choline used in Example 15, above, there may be substituted in stoichiometric equivalent quantities, ammonia, ammonium hydroxide, ammonium carbonate and ammonium bicarbonate. The remainder of the steps being the same and the resultant compound being ammonium sennoside tannate.

Example 18

In place of the choline used in Example 15, above, there may be substituted in stoichiometric equimolecular quantities sodium hydroxide, sodium carbonate, sodium bicarbonate, potassium hydroxide, potassium carbonate, potassium bicarbonate, lithium hydroxide, lithium carbonate, lithium bicarbonate, magnesium oxide, magnesium hydroxide, magnesium carbonate, magnesium bicarbonate, calcium oxide, calcium hydroxide, calcium carbonate, calcium bicarbonate, iron oxide, iron hydroxide, iron carbonate, iron bicarbonate, aluminum oxide, aluminum hydroxide, aluminum carbonate, aluminum bicarbonate, zinc oxide, zinc hydroxide, zinc carbonate, zinc bicarbonate.

The solution of the metallic oxide, hydroxide, carbonate or bicarbonate, is added as a dilute solution, as for example, 1 percent, in a careful, drop-wise manner, with stirring. When all of the metallic ion has been added, the solution is warmed for one-half hour and three volumes of acetone are added. The mixture is then set aside to crystallize in an ice chest. The crystals are separated by filtration and dried. The dried crystals are the respective metallic salt of the sennoside tannate, as set forth in Table II below:

TABLE II

| Metallo compound used as reagent: | Respective sennoside tannate compound obtained |
|---|---|
| Sodium hydroxide | Sodium sennoside tannate. |
| Sodium carbonate | Do. |
| Sodium bicarbonate | Do. |
| Potassium hydroxide | Potassium sennoside tannate. |
| Potassium carbonate | Do. |
| Potassium bicarbonate | Do. |
| Lithium hydroxide | Lithium sennoside tannate. |
| Lithium carbonate | Do. |
| Lithium bicarbonate | Do. |
| Magnesium oxide | Magnesium sennoside tannate. |
| Magnesium hydroxide | Do. |
| Magnesium carbonate | Do. |
| Magnesium bicarbonate | Do. |
| Calcium oxide | Calcium sennoside tannate. |
| Calcium hydroxide | Do. |
| Calcium carbonate | Do. |
| Calcium bicarbonate | Do. |
| Iron oxide | Iron sennoside tannate. |
| Iron hydroxide | Do. |
| Iron carbonate | Do. |
| Iron bicarbonate | Do. |
| Aluminum oxide | Aluminum sennoside tannate. |
| Aluminum hydroxide | Do. |
| Aluminum carbonate | Do. |
| Aluminum bicarbonate | Do. |
| Zinc oxide | Zinc sennoside tannate. |
| Zinc hydroxide | Do. |
| Zinc carbonate | Do. |
| Zinc bicarbonate | Do. |

Example 19

The pure Sennosides A and B may be obtained by liberating these glycosides from the sennoside amine obtained as a result of the extraction of a senna plant or its parts with a solvent containing an amine compound. In order to obtain the sennoside in pure form directly from the plant by an amine extraction process, an inert solvent, such as water or a lower aliphatic alcohol, may be used providing that the inert solvent is one in which the formed amine-sennoside is soluble. This method has the advantage of bypassing costly and cumbersome organic solvent extraction procedures and provides for the simple procurement of Sennosides A and B in pure form.

It is necessary that the plant substance to be used as the starting material be ground to a substantially fine particle size, as for example, at least 100 mesh particle size, and also to be defatted to permit the rapid interchange of polar substances across the lipid cell wall. While any defatting process, such as is known to the art, may be used, a preferred method is to treat the ground plant material with petroleum benzin or benzol and filtering the solid material and drying.

Five kilograms of the defatted senna plant or selected parts of the senna plant, as for example, the seed pod or the leaf, are packed into a suitable percolation vessel and an aqueous solution of 0.1 percent choline bicarbonate is passed through the packed percolation chamber at a convenient flow rate, as for example, one to two cc. per minute. The percolation is continued until a freshly collected sample indicates an absence in the current percolate of anthraquinone substances by the usual colorimetric tests. The collected percolate is then concentrated under reduced pressure to a volume of from 350 cc. to 500 cc. To this is added 1 liter of absolute methanol and the mixture filtered. The solution is concentrated to a volume of 100 cc. under reduced pressure and to this is added 500 cc. of acetone. The whole is then set aside to crystallize in an ice-chest. The precipitate material is then separated by filtration and dried. The dried precipitate is then extracted several times with acetone and then extracted with 70 percent hot aqueous methanol. The methanol extract is assayed chemically for sennoside content and a stoichiometric equivalent of tannic acid is added to liberate and remove the amine present. The ratio of tannic acid to be added to the sennoside content determined for the concentrates is 2 mols of tannic acid for each mol of sennoside. A copious precipitate forms on the addition of the tannic acid to the methanol solution which after sedimentation, is filtered. The filtrate is concentrated to a volume of not more than 50 cc. and is diluted with 4 volumes of cold water and set aside to crystallize. The crystals obtained are Sennosides A and B, decomposing at about 185–190° C. and are insoluble in water, but soluble in 70 percent methanol and acetone. The sennosides obtained analyze in good agreement with their theoretical values and have a molecular weight of 862.7, and conform to the physical and chemical properties described for Sennosides A and B. On biological assay, the sennosides obtained exhibit a good degree of biologic activity in excellent conformity to that of the standard reference sennosides used.

*Example 20*

In place of the choline solution used in Example 19, above, there may be substituted any amine, soluble in the inert percolation solvent used. Such amines as betaine, morpholine, pyrrole, pyridine, methylamine, ethylamine, propylamine, isopropylamine, isobutylamine and their respective di and tri alkylamines, with a chain length of from 1 to 4 carbons and the mono, di and tri alkanolamines, having an alkyl chain length of from 1 to 4 carbons. These amines may be used in aqueous solution as a percolation menstrum, in concentration of at least 0.01 percent. However, the range between 0.1 and 2 percent is the preferred concentration range.

An inert alcohol solvent such as methanol, ethanol, isopropanol, butanol, isobutanol, cyclohexanol and furfurol, may also be utilized with the said amines. A limitation to the selection of a suitable alcohol for this purpose is the necessity for the respective amine sennoside obtained, to be soluble therein, in an extent greater than 5 percent. If this condition is not met, the alcohol may still be used as a solvent menstrum, however, proportionately larger volumes will be required. The remainder of the steps being the same as those described in Example 19, above, and the resultant product obtained are the Sennosides A and B, corresponding to those reported in the literature as well as those obtained as a result of Example 19.

When a liquid amine, as for example, morpholine, pyrrole or pyridine is used, then it may be used as the sole extraction menstrum, in which case the percolate obtained is distilled under reduced pressure, at temperatures not exceeding 40° C. and the residue is repeatedly extracted with hot 70 percent methanol until the residue gives a negative test for anthraquinones. The methanol extract is then treated with tannic acid to remove the amine and to liberate the sennosides. The purification step is then carried out as described in Example 19, above, and the product obtained is Sennosides A and B. Sennoside B may be separated from Sennoside A by extraction with boiling water.

*Example 21*

In place of the tannic acid used to remove the amine, there may be substituted any acid, as for example, hydrochloric acid, sulphuric acid, nitric acid, phosphoric acid, acetic acid, tartaric acid, succinic acid, citric acid, propionic acid and benzoic acid, which is capable of solubilizing the amine moiety in the solvent while liberating the sennosides. The acidification of the amine sennosides in order to liberate the sennosides may be carried out in water, and sufficient acid is added so that the pH of the solution is between pH 2 and pH 3. When the lower aliphatic acids are used, there will be a precipitation of the sennoside, while the amine acid salt will be kept in solution. When the aromatic acids are used, the amine acid salt may be coprecipitated with the sennosides. However, these may be readily separated through extraction with a 20 percent aqueous acetone solution. The sennosides are not soluble in this solvent.

The sennosides may also be liberated from the amine moiety through the use of alkali, as for example, ammonia, sodium hydroxide, potassium hydroxide, calcium hydroxide and magnesium hydroxide, or the carbonate or bicarbonate salts of the above metallic ions. When these alkaline substances are used, water is the preferred solvent, although any inert solvent may be used in which all components are soluble. After the solution is made alkaline to a pH of 8, upon the addition of a suitable quantity of the respective alkali substance chosen, the mixture is extracted several times with small portions of ether and then rapidly evaporated to dryness, under reduced pressure. The residue is dissolved in just sufficient ethanol and made acid with hydrochloric acid and filtered. The solution is evaporated to dryness under reduced pressure, and the residue extracted with dioxane. The dioxane solution is mixed with an equal volume of ether and set aside to crystallize. The crystals are Sennosides A and B, conforming, in every respect, to those obtained from Example 19, above. Again, the sennosides may be separated from one another by boiling water extraction.

*Example 22*

When it is desired to utilize sennoside tannate, sennoside amine tannate, sennoside ammonium tannate or metallo-sennoside tannate, in clinical medicine, these may be dispensed in the form of tablets, capsules, granules or liquid preparations for oral administration, or as a suppository or enema for rectal administration, or as an injection for parenteral administration.

When it is intended to prepare unit dosage forms for therapeutic administration of the said new sennosidal derivatives, it is necessary that these be prepared so that the equivalent of sennoside content for each unit dose contains at least 2 mg. of sennoside. The total daily dose may range as high as 75 mg. of sennoside, since this total daily dose is governed by the therapeutic purpose for which the dose is administered. Thus, a dose intended to prepare the lower intestinal tract for radiologic examination, will require a higher quantity of the respective sennosidal compound than will a dose intended to induce bowel function.

To prepare tablets of these new solid substances, it is necessary that the selected active ingredient be mixed with at least an equal weight of a diluent, as for example, lactose, dextrose, sucrose, potato starch, corn starch or mannitol, and granulated with a neutral granulating solution, as for example, 1 percent aqueous gelatin solution or aqueous alcohol. After drying the mixture, suitable binders, as for example, gum acacia or gum tragacanth are added, together with lubricants, as for example, magnesium stearate or stearic acid, and the whole intimately mixed and passed through a No. 60 mesh sieve. A neutral granulating solution may be utilized at this step, if desired, as for example, 50 percent ethanol. The dried granulation is then compressed and tableted into suitable size and shape, each tablet containing the equivalent of at least 2 mg. of the sennoside, and as much as 75 mg. of the sennoside.

Capsules may be prepared by mixing the selected sennosidal derivative with a diluent such as lactose, corn starch, potato starch, sucrose or mannitol, in a ratio of one part sennosidal compound to at least one part diluent, and mixing the combination thoroughly and then filling into gelatin capsules of suitable size and shape, so that each capsule contains the equivalent of at least 2 mg. of sennoside.

When a granule is desired, the selected sennosidal compound is mixed with suitable diluents, as noted above, to prepare tablets, and passed through a screen of from 8 to 20 mesh particle size, utilizing an alcohol-water granulating solution. Pharmaceutically suitable coloring and flavoring materials may be added and homogeneous granules are obtained which are suitable for dispersion in an aqueous fluid such as water, fruit juice or milk, or may be taken directly. The granule is administered by weight or volume, as for example, gram or teaspoonful, and the concentration of sennosidal compound per unit dose of the granule form is at least 2 mg. sennoside-equivalent.

Liquid preparations for oral administration may be prepared by dissolving a suitable concentration of the selected sennosidal compound in a pharmaceutically acceptable solvent such as water, ethanol, glycerin, sorbitol, propylene glycol or mixtures of these, so that each unit dose, as for example, teaspoonful or tablespoonful, contains at least 2 mg. of the sennoside equivalent. Flavoring and coloring may be added, if desired.

For rectal administration, suppository or enema dosage form is used. When a suppository preparation is desired, these are prepared by incorporating the appropriate quantity of the selected sennosidal derivative so that each suppository contains at least 2 mg. of sennoside equivalent with sufficient cocoa butter or any pharmaceutically acceptable suppository base and then shaping by molding or compressing into suppositories, each weighing 2 gm. Enema solutions may be prepared by dispersing or dissolving the selected sennosidal compound with a solvent such as water, glycerin, sorbitol or mixtures of these and then instilling the liquid preparation into the rectum and lower colon. An enema may be prepared so that its unit volume is from 2 ounces to 16 ounces and, also, so that the total unit enema preparation contains at least 2 mg. of the sennoside. In the preparing the enema, it should be observed that a slightly hypertonic solution is preferred.

Injections of the sennosidal compounds are prepared by dissolving a suitable quantity of the selected sennosidal compound in water for injection so that each cc. contains at least 2 mg. of sennosidal equivalent. Suitable preservatives, such as the parabens, may be added and the solution is prepared under a strict aseptic technique. The solution is filtered through a bacteriologic filter in order to sterilize and then filled into glass ampules which are hermetically sealed. The solution of the new sennosidal compounds are administered intramuscularly or intravenously.

The term "sennoside" used in the above dosage forms and the claims, comprehends Sennoside A, Sennoside B, and mixtures of these, while the term "sennosidal compound" comprehends sennoside tannate, Sennoside A tannate, Sennoside B tannate, amine sennoside, amine sennoside tannate, ammonium sennoside tannate and metallo-sennoside tannate, examples of all of which have been furnished above.

Example 23

When it is desired to induce peristaltic activity, then this may be achieved through the administration of a dosage form containing the new sennoside by either the oral, rectal or parenteral routes, so as to increase the blood level of the sennosides. A dosage form containing at least 2 mg. of the sennosides is utilized. When the medication is administered by the oral route, then it is preferred that this dose be given at bedtime, while when administered rectally, it may be given one hour prior to the desired time of onset of physiologic activity. Any of the dosage forms described in Example 22, above, may be utilized to increase the blood level of the sennosides and any of the sennosidal derivatives described in Examples 1 through 18 may be used to prepare the dosage forms described in Example 22, to be used to achieve this increased blood level.

While the minimum amount of the sennoside equivalent set forth above, in the previous examples, is stated as being at least 2 mg., the effective therapeutic range is from 2 mg. to 75 mg. of the sennosidal compounds described.

What is claimed is:
1. A molecule selected from the group consisting of:
    (a) Sennoside A tannate
    (b) Sennoside B tannate
    (c) molecules having the structure RX, wherein R is a moiety selected from the group consisting of Sennoside A tannate and Sennoside B tannate and X is a moiety selected from the group consisting of metallo ions, ammonium ions, and pharmaceutically acceptable amines, and
    (d) the molecules having the structure SY wherein S is a moiety selected from the group consisting of Sennoside A and Sennoside B and Y is a moiety selected from the group consisting of primary aliphatic amines, secondary aliphatic amines, cyclic amines, heterocyclic amines, choline and betaine.
2. Sennoside tannate.
3. Choline sennoside.
4. Betane sennoside.
5. Morpholine sennoside.
6. Methylglucamine sennoside.
7. Diethanolamine sennoside.
8. Promazine sennoside.
9. Chlorpromazine sennoside.
10. Amphetamine sennoside.
11. n-Methylephedrine sennoside.
12. Morphine sennoside.
13. Codeine sennoside.
14. Cholinesennoside tannate.
15. Betainesennoside tannate.
16. Morpholinesennoside tannate.
17. Methylglucaminesennoside tannate.
18. Triethylaminesennoside tannate.
19. Monoethanolaminesennoside tannate.
20. Promazinesennoside tannate.
21. Amphetaminesennoside tannate.
22. Ephedrinesennoside tannate.
23. Codeinesennoside tannate.
24. Ammoniumsennoside tannate.
25. Sodiumsennoside tannate.
26. The method of preparing a sennoside derivative described in claim 1, which comprises the steps of:
    (a) Mixing in an inert medium a compound selected from the group consisting of Sennoside A, Sennoside B, mixtures of Sennoside A and Sennoside B, and material of botanical origin containing Sennoside A and Sennoside B with
    (b) a member of the group consisting of:
        (1) tannic acid and
        (2) pharmaceutically acceptable amines and
    (c) with respect to the resulting senna tannate, mixing with the same in an inert medium a compound selected from the group consisting of
        (1) pharmaceutically acceptable amines

(2) pharmaceutically acceptable metallo ions, and
(3) ammonium ions, and
(d) isolating the respective reaction products formed as a result of the admixture with compounds of class "(b)" and "(c)" above referred to.

27. The method of preparing senna tannate which comprises the steps of mixing in an inert medium a compound selected from the group consisting of Sennoside A, Sennoside B, mixtures of Sennoside A and Sennoside B, and material of botanical origin containing Sennoside A and Sennoside B with tannic acid and isolating the respective reaction product formed.

28. The method of preparing choline sennoside which comprises the steps of mixing, in an inert medium, a compound selected from the group consisting of Sennoside A, Sennoside B, mixtures of Sennoside A and Sennoside B, and material of botanical origin containing Sennoside A and Sennoside B, with a compound selected from the group consisting of choline, choline carbonate and choline bicarbonate and isolating the resultant choline sennoside.

29. The method of preparing promazine sennoside which comprises the steps of mixing, in an inert medium, a compound selected from the group consisting of Sennoside A, Sennoside B, mixtures of Sennoside A and Sennoside B and material of botanical origin containing Sennoside A and Sennoside B with a compound selected from the group consisting of promazine, promazine carbonate and promazine bicarbonate and isolating the resultant promazine sennoside.

30. The method of preparing amine sennoside tannate which comprises the steps of mixing in an inert medium, a compound selected from the group consisting of Sennoside A tannate, Sennoside B tannate, and mixtures of Sennoside A tannate and Sennoside B tannate with a stoichiometric quantity of a member of the group consisting of pharmaceutically acceptable amines and isolating the respective amine sennoside tannate.

31. The method of preparing Sennoside A and Sennoside B which comprises the steps of mixing, in an inert solvent, from 3 to 5 parts of a compound selected from the group consisting of a soluble amine, a soluble acid, a soluble alkali, with one part of a compound selected from the group consisting of Sennoside A tannate, Sennoside B tannate, amine sennoside tannate, metallo sennoside tannate and ammonium sennoside tannate and isolating the formed Sennoside A and Sennoside B.

32. The method of preparing Sennoside A which comprises the steps of mixing, in an inert solvent, from 3 to 5 parts of a compound selected from the group consisting of a soluble amine, a soluble acid, a soluble alkali, with one part of a compound selected from the group consisting of Sennoside A tannate, amine sennoside tannate, metallo sennoside tannate and ammonium sennoside tannate and isolating the formed Sennoside A.

33. The method of preparing Sennoside B which comprises the steps of mixing, in an inert solvent, from 3 to 5 parts of a compound selected from the group consisting of a soluble amine, a soluble acid, a soluble alkali with one part of a compound selected from the group consisting of Sennoside B tannate, amine sennoside tannate, metallo sennoside tannate and ammonium sennoside tannate and isolating the formed Sennoside B.

34. The method of preparing Sennoside A comprising the steps of mixing, in an inert solvent, from 3 to 5 parts of a compound selected from the group consisting of choline, morpholine, methylamine, propylamine, dipropylamine, dibutylamine, diethanolamine and triethanolamine, soluble in said inert solvent, with one part of a compound selected from the group consisting of Sennoside A tannate, amine sennoside tannate, metallo sennoside tannate and ammonium sennoside tannate and isolating the formed Sennoside A.

35. The method of preparing Sennoside B comprising the steps of mixing, in an inert solvent, from 3 to 5 parts of a compound selected from the group consisting of choline, morpholine, methylamine, propylamine, dipropylamine, dibutylamine, diethanolamine and triethanolamine, soluble in said inert solvent, with one part of a compound selected from the group consisting of Sennoside B tannate, amine sennoside tannate, metallo sennoside tannate and ammonium sennoside tannate and isolating the formed Sennoside B.

36. The method of preparing Sennoside A comprising the steps of mixing, in an inert solvent, 3 to 5 parts of a compound selected from the group consisting of hydrochloric acid, sulphuric acid, nitric acid, tannic acid, benzoic acid, succinic acid, citric acid and tartaric acid, soluble in said inert solvent, with one part of a compound selected from the group consisting of Sennoside A tannate, amine sennoside tannate, metallo sennoside tannate and ammonium sennoside tannate and isolating the formed Sennoside A.

37. The method of preparing Sennoside B comprising the steps of mixing, in an inert solvent, 3 to 5 parts of a compound selected from the group consisting of hydrochloric acid, sulphuric acid, nitric acid, tannic acid, benzoic acid, succinic acid, citric acid and tartaric acid, soluble in said inert solvent, with one part of a compound selected from the group consisting of Sennoside B tannate, amine sennoside tannate, metallo sennoside tannate and ammonium sennoside tannate and isolating the formed Sennoside B.

38. The method of preparing Sennoside A comprising the steps of mixing, in an inert solvent, 3 to 5 parts of a compound selected from the group consisting of sodium hydroxide, sodium carbonate, sodium bicarbonate, potassium hydroxide, potassium carbonate, potassium bicarbonate, lithium hydroxide, lithium carbonate, lithium bicarbonate, magnesium oxide, magnesium hydroxide, magnesium carbonate, magnesium bicarbonate, calcium oxide, calcium hydroxide, calcium carbonate, calcium bicarbonate, iron oxide, iron hydroxide, iron carbonate, iron bicarbonate, aluminum oxide, aluminum hydroxide, aluminum carbonate, aluminum bicarbonate, zinc oxide, zinc hydroxide, zinc carbonate, zinc bicarbonate, ammonia, ammonium hydroxide, ammonium carbonate and ammonium bicarbonate, soluble in said inert solvent, with one part of a compound selected from the group consisting of Sennoside A tannate, amine sennoside tannate, metallo sennoside tannate and ammonium sennoside tannate and isolating the formed Sennoside A.

39. The method of preparing Sennoside B comprising the steps of mixing, in an inert solvent, a stoichiometric quantity of a compound selected from the group consisting of sodium hydroxide, sodium carbonate, sodium bicarbonate potassium hydroxide, potassium carbonate, potassium bicarbonate, lithium hydroxide, lithium carbonate, lithium bicarbonate, magnesium oxide, magnesium hydroxide, magnesium carbonate, magnesium bicarbonate, calcium oxide, calcium hydroxide, calcium carbonate, calcium bicarbonate, iron oxide, iron hydroxide, iron carbonate, iron bicarbonate, aluminum oxide, aluminum hydroxide, aluminum carbonate, aluminum bicarbonate, zinc oxide, zinc hydroxide, zinc carbonate, zinc bicarbonate, ammonia, ammonium hydroxide, ammonium carbonate and ammonium bicarbonate, soluble in said inert solvent, with one part of a compound selected from the group consisting of Sennoside B tannate, amine sennoside tannate, metallo sennoside tannate and ammonium sennoside tannate and isolating the formed Sennoside B.

40. A pharmaceutical composition comprising a pharmaceutical carrier and from 2 to 75 mg. of sennoside equivalent of a compound selected from the group consisting of Sennoside A tannate, Sennoside B tannate, amine sennoside, amine sennoside tannate, metallo sennoside tannate, ammonium sennoside tannate and a composition of botanical origin containing Sennoside A tannate, Sennoside B tannate, amine sennoside, amine sennoside tannate, metallo sennoside tannate, ammonium sennoside tannate and mixtures of the same.

41. A pharmaceutical composition as described in claim 40, said compound being codeine sennoside.

42. A pharmaceutical composition as described in claim 40, said compound being choline sennoside tannate.

43. A pharmaceutical composition as described in claim 40, said compound being sodium sennoside tannate.

44. A pharmaceutical composition as described in claim 40, said compound being magnesium sennoside tannate.

45. A pharmaceutical composition as described in claim 40, said compound being aluminum sennoside tannate.

46. A pharmaceutical composition as described in claim 40, said compound being iron sennoside tannate.

47. A method of inducing peristaltic stimulation comprising the steps of administering from 2 to 75 mg. of a compound selected from the group consisting of the molecules described in claim 1.

48. A method of inducing peristaltic stimulation comprising the administration of a pharmaceutical composition consisting of a pharmaceutical carrier and from 2 to 75 mg. of a compound seelcted from the group consisting of the molecules described in claim 1.

References Cited by the Examiner

UNITED STATES PATENTS

| | | | |
|---|---|---|---|
| 2,833,690 | 5/1958 | Eutrekin | 167—56 |
| 2,938,832 | 5/1960 | Huggins | 167—56 |
| 2,970,942 | 2/1961 | Halpern | 260—210 |
| 3,016,372 | 1/1962 | Krimmel | 260—210 |
| 3,060,169 | 10/1962 | Stoll | 260—210 |

LEWIS GOTTS, *Primary Examiner.*

FRANK CACCIAPAGLIA, JR., *Examiner.*

SAM ROSEN, JOHNNIE R. BROWN,
*Assistant Examiners.*